US005345548A

United States Patent [19]

Nomura et al.

[11] Patent Number: 5,345,548

[45] Date of Patent: Sep. 6, 1994

[54] CHARACTER DISPLAY APPARATUS FOR DISPLAYING MULTIPLE-FONT CHARACTERS WITH HIGH SPEED

[75] Inventors: Tatsuya Nomura, Tenri; Yumi Yamauchi, Nara; Kenji Mameda, Kashihara; Shigeru Yoshida, Katsuragi; Noboru Kubo, Yamato-Koriyama, all of Japan

[73] Assignee: Sharp Kabushiki Kaisha, Osaka, Japan

[21] Appl. No.: 702,805

[22] Filed: May 20, 1991

[30] Foreign Application Priority Data

May 22, 1990 [JP] Japan .................................. 2-131753

[51] Int. Cl.[5] .............................................. G06F 15/00

[52] U.S. Cl. ..................................... 395/150; 345/193

[58] Field of Search ............... 395/150, 151, 164, 166, 395/110, 102; 340/735, 790, 700; 345/193

[56] References Cited

U.S. PATENT DOCUMENTS

| | | | |
|---|---|---|---|
| 4,345,245 | 8/1982 | Vella et al. | 395/150 X |
| 4,918,429 | 4/1990 | Clarke | 340/790 |
| 5,001,653 | 3/1991 | Buchanan | 395/102 |
| 5,208,908 | 5/1993 | Harrison et al. | 395/150 |

OTHER PUBLICATIONS

"Multi-Font Handling For Large Character Set On Workstations"–Makoto Kobayashi and Yoshiaki Mima, 1987 IEEE, pp. 2-8.

Yumi Yamauchi and Noboru Kubo–"Hypermedia System with Typesetter (3)–Font Generation–", Information Process Academy No. 36, General Meeting, 1988, pp. 2305–1306.

*Primary Examiner*—Mark K. Zimmerman

*Attorney, Agent, or Firm*—David G. Conlin; Kevin J. Fournier; Peter F. Corless

[57] ABSTRACT

A character display apparatus with an attribute management unit for storing an attribute of a used font, a raster image storage unit for storing a raster image of the used font, and an image position management unit for storing a storage position of each raster image in the raster image storage unit in correspondence with each attribute of the attribute management unit. The character display apparatus also includes a judgment unit for judging whether a raster image of a character to be displayed is stored in the raster image storage unit or not, by referring to the attribute management unit and the image position management unit. The character display apparatus is further provided with a display unit for displaying an image of the character by use of the raster image in the raster image storage unit, in case that the raster image is stored therein.

5 Claims, 7 Drawing Sheets

CHARACTER DISPLAY APPARATUS FOR DISPLAYING MULTIPLE-FONT CHARACTERS WITH HIGH SPEED

BACKGROUND OF THE INVENTION

1. Field of the Invention

The present invention relates to a character display apparatus, which can display multi-font characters.

2. Description of the Related Arts

In an apparatus for displaying characters or editing documents, which has a high function to handle various kinds of fonts (multi-font) and various sizes of characters, all raster images of the characters are not stored in an internal memory device such as an IC (Integrated Circuit) memory device. In many cases, these raster images are all or partially stored in an external memory device, or stored in the form of vector-font such as outline-font.

In this kind of character display apparatus, in order to handle these various kinds of fonts and various sizes of the characters, it is necessary to read the character to be displayed from the external memory device in each pertinent occasion, enlarge or reduce the scale of the raster image existing in the character display apparatus, or form the required raster image from the vector font. Accordingly, the load applied to the character displaying portion becomes so large that it takes long time to read from the external memory device, enlarge or reduce the scale of the raster image, or unfold the vector font and so on.

SUMMARY OF THE INVENTION

It is therefore an object of the present invention to provide a character display apparatus, in which the displaying speed in case of displaying multi-font characters can be increased.

According to the present invention, the above mentioned object can be achieved by a character display apparatus provided with an attribute management unit for storing an attribute of a used font, a raster image storage unit for storing a raster image of the used font, and an image position management unit for storing a storage position of each raster image in the raster image storage unit in correspondence with each attribute of the attribute management unit. The character display apparatus is also provided with a judgment unit for judging whether a raster image of a character to be displayed is stored in the raster image storage unit or not, by referring to the attribute management unit and the image position management unit. The character display apparatus is further provided with a display unit for displaying an image of the character by use of tile raster image in the raster image storage unit, in case that the raster image is stored therein.

In the above-described character display apparatus, a raster image such as a raster image of a font obtained by reading from an external memory device, a raster image obtained by enlarging or reducing its scale, a raster image obtained by unfolding a vector font, etc. is stored into the raster image storage unit when it is used for a displaying operation on the display unit. Then, in case that the same raster image is to be used for another displaying operation afterward, it is judged by the judgment unit whether the pertinent raster image is already stored in the raster image storage unit, or not. In case that it is judged to be stored, this raster image in the raster image storage unit is used for the required display operation, without newly forming the same raster image.

Accordingly, the character display apparatus of the present invention can display multi-font characters, without newly forming a required raster image in many cases especially as the displaying operations are continued in many times, resulting in a great advantage of increasing the displaying speed even in the complicated case of displaying multi-font characters.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
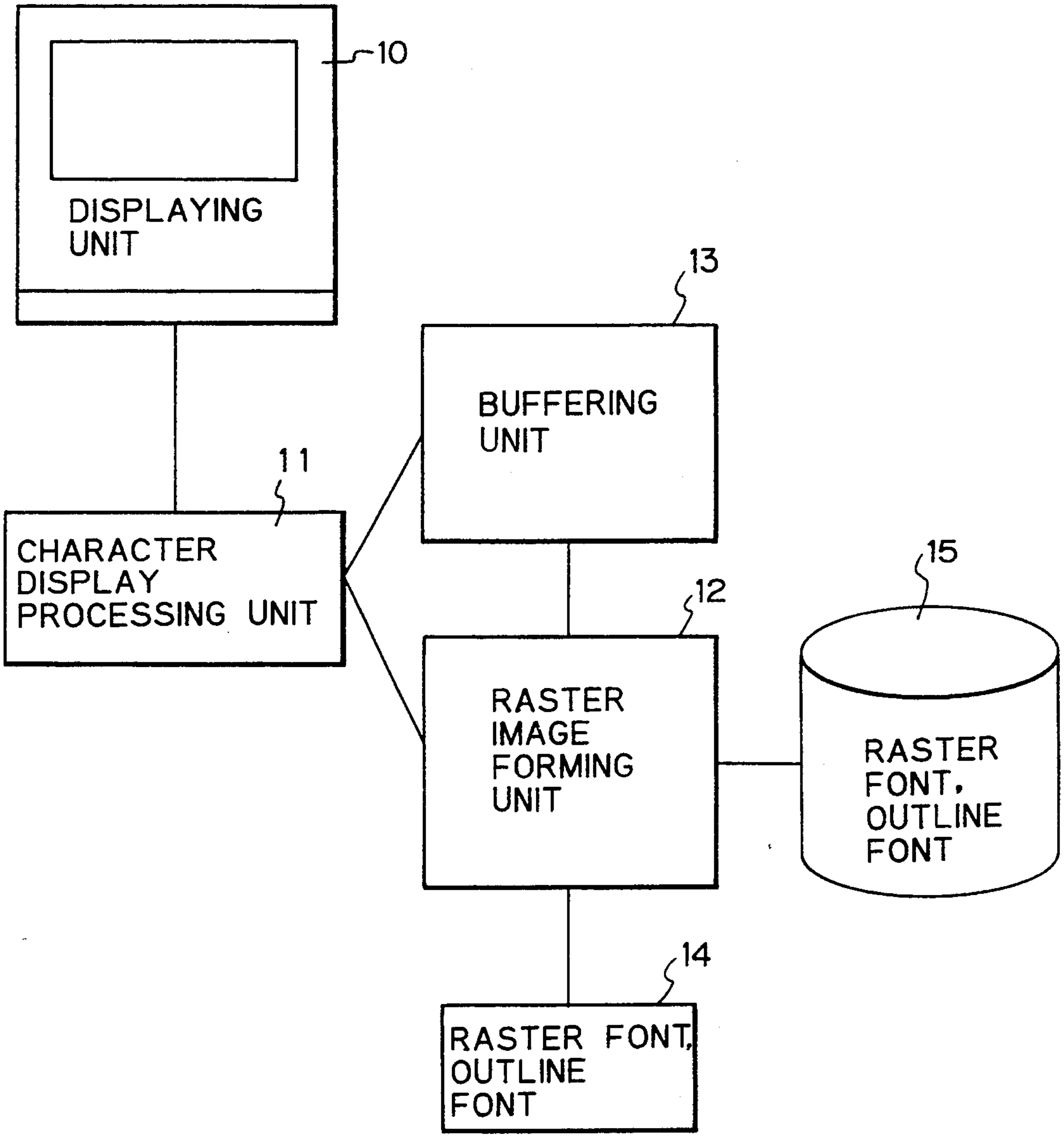
FIG. 1 is a block diagram showing a summarized construction of a character display apparatus as an embodiment of the present invention.

FIG. 1 is a block diagram showing a summarized construction of a character display apparatus as an embodiment of the present invention.

In FIG. 1, the reference number 10 designates a displaying unit such as a CRT (Cathode Ray Tube) device, and a LCD (Liquid Crystal Display) device. A character display processing unit 11 for controlling the whole operation of the character display apparatus, is connected to the displaying unit 10. A raster image forming unit 12 for newly forming a raster image, and a buffering unit 13 for storing the formed raster image, are connected to the character display processing unit 11.

An internal memory device 14, such as an IC memory device, for storing a raster font, an outline font etc., and an external memory device 15 for storing a raster font, an outline font etc., are connected to the raster image forming unit 12.

Figure 2:
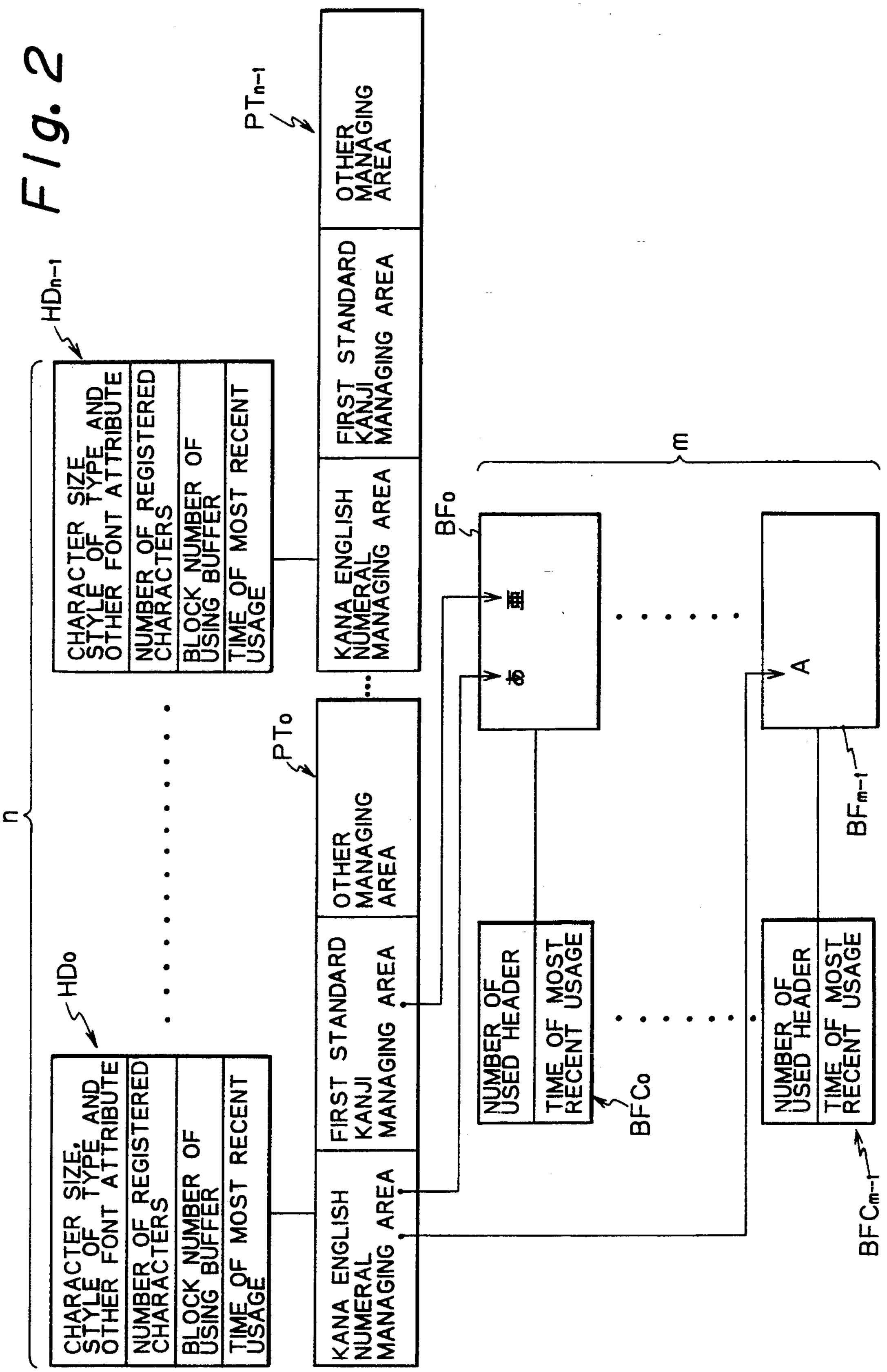
FIG. 2 is a block diagram showing a construction of a buffering unit in the character display apparatus of FIG. 1.

FIG. 2 is a block diagram showing a construction of the buffering unit 13 in the character display apparatus of FIG. 1.

In FIG. 2, the buffering unit is provided with font headers $HD_0$ to $HD_{n-1}$ as an example of an attribute management means, consisting of n blocks in general, for managing the font attribute used in the document. The character size, the style of type, and other font attribute, as well as the number of the characters corresponding to the font attribute presently registered, the block number of the buffer which the header presently uses, and the time of the most recent usage of the header, are stored in the font headers $HD_0$ to $HD_{n-1}$.

Pointer tables $PT_0$ to $PT_{n-1}$ as an example of an image position storage means, for managing the storage position where the raster images having the font attribute corresponding to the font headers $HD_0$ to $HD_{n-1}$ are stored, are respectively connected to the font headers $HD_0$ to $HD_{n-1}$. Data indicating the storage position of the raster image of the characters which are used in high frequency, such as Kana (Japanese syllabary) -English-numeral characters and the first standard Kanji characters (Chinese character primarily used in Japanese writing) , are registered in the pointer tables $PT_0$ to $PT_{n-1}$ in the order of the character code, such that each storage position can be found by calculation on the data by means of a simple calculation equation such as a hash function. Accordingly, with respect to such character codes as for the Kana-English-numeral characters and the first standard Kanji characters, it is possible to judge quickly whether there exist the corresponding raster images or not, by referring to the pointer tables $PT_0$ to $PT_{n-1}$.

Since other characters are used in low frequency, the pointer tables $PT_0$ to $PT_{n-1}$ are adapted such that these other characters are registered in the pointer tables $PT_0$ to $PT_{n-1}$ in the order of their usage, and such that these registered characters are further erased from the pointer tables $PT_0$ to $PT_{n-1}$ in the order of their registrations, when the empty area in the exclusive managing area assigned to these other characters are filled up by them. That is to say, the method similar to the FIFO (First In First Out) method is adopted here for registering and erasing these other characters.

Alternatively, in case that these other characters are also to be used in high frequency, a managing method utilizing the two or more divided tree structure of the buffer may be employed so as to increase the displaying speed as for these other characters as well as the above mentioned Khana-English-numeral characters and first standard Kanji characters.

In FIG. 2, the buffering unit is also provided with font buffers $BF_0$ to $BF_{m-1}$ as an example of a raster image storage means, consisting of m blocks ($n \leqq m$) in general, for storing the raster images of the characters, respectively. Buffer managing portions $BFC_0$ to $BFC_{m-1}$ for managing the condition in usage of each of the font buffers $BF_0$ to $BF_{m-1}$, are connected to the respective buffers $BF_0$ to $BF_{m-1}$. The time of the most recent usage of the corresponding buffer $BF_0$ to $BF_{m-1}$, and the number of the font header $HD_0$ to $HD_{n-1}$ using this corresponding font buffer $BF_0$ to $BF_{m-1}$, are stored in each of the buffer managing portions $BFC_0$ to $BFC_{m-1}$.

The operation of the character display apparatus constructed as described above, will be explained hereinbelow, with reference to FIGS. 3 to 7, which are the flowcharts of the control program of the present embodiment.

Figure 3:
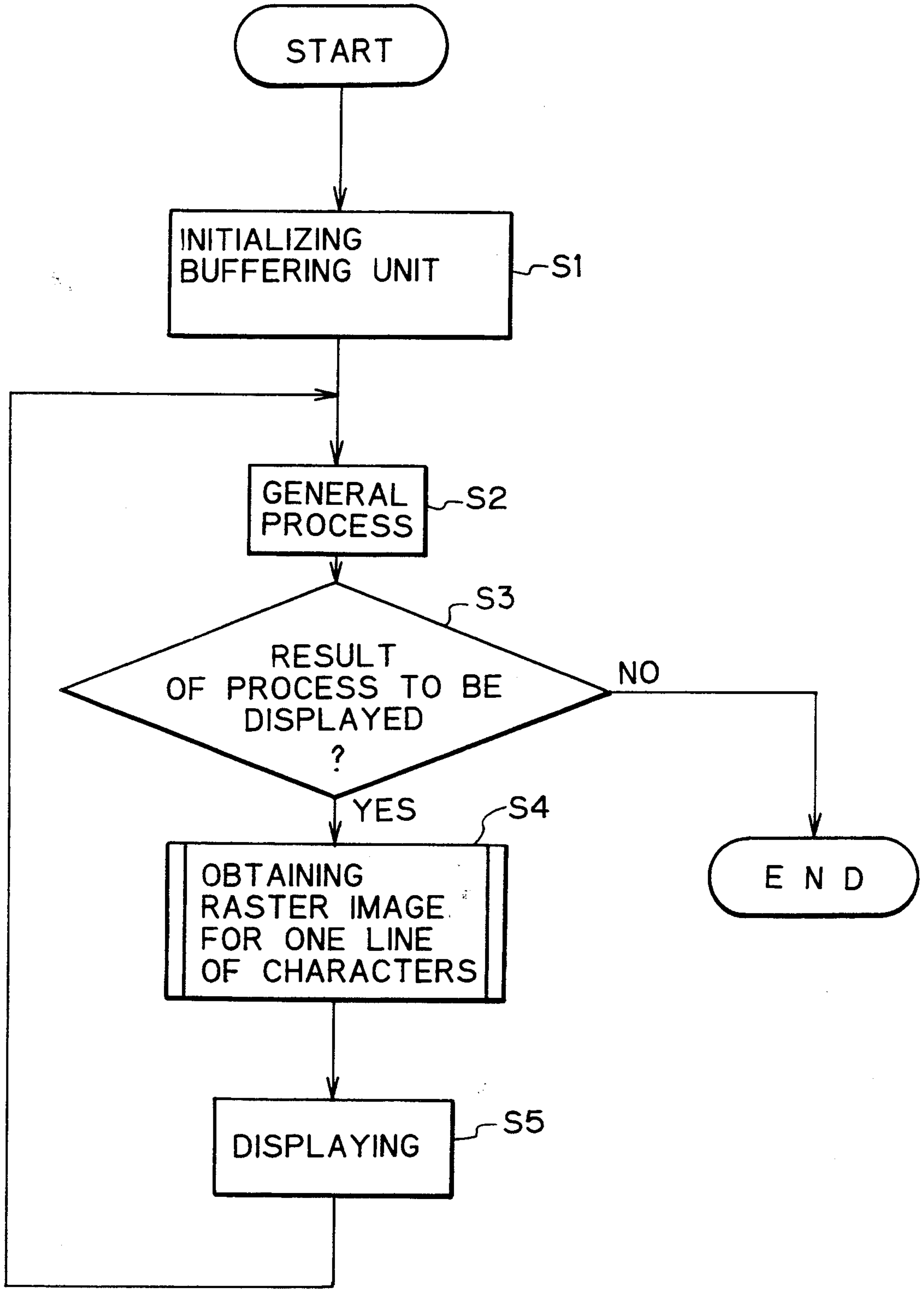
FIG. 3 is a flowchart showing an operation by a control program in the character display apparatus of FIG. 1.

In FIG. 3, when the character display apparatus is started, the buffering unit is initialized at the step S1. By this initialization, the memory areas i.e. the font headers, the font buffers etc. , are assured. Then, a general process of the character display apparatus, such as a keyboard inputting process, a reading process from a file, etc. is performed in the step S2. Then, it is judged whether the result of this process is to be displayed or not, at the step S3.

If it is judged that it is not to be displayed (NO), the operation is ended. If it is judged that it is to be displayed (YES) in the step S3, the flow branches to the step S4. In the step S4, the raster image for one line of the characters to be displayed is obtained as described later in detail, and is then displayed on the display unit in the step S5. Then, the flow goes back to the step S2 and the above-mentioned operation is repeated.

Figure 4:
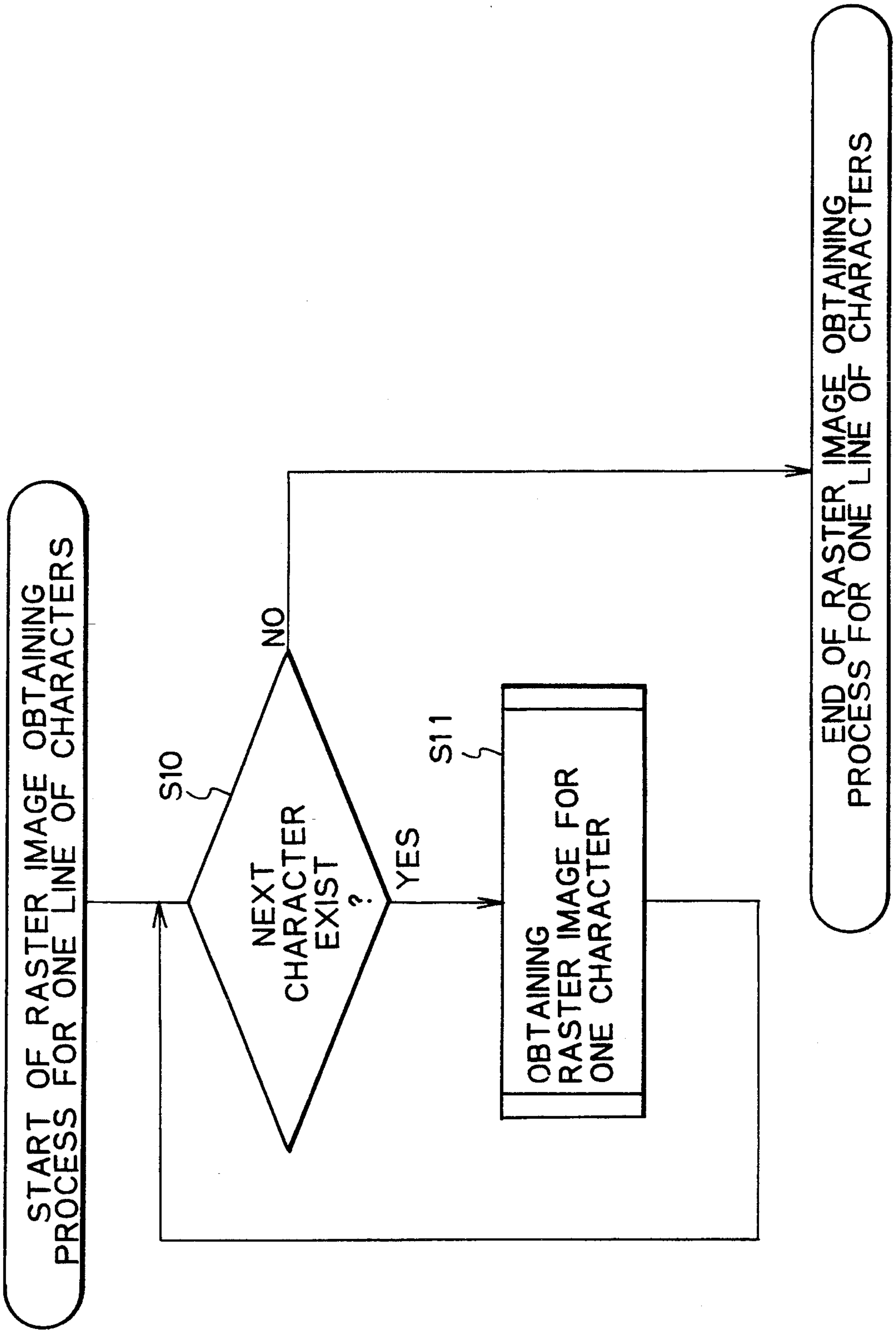
FIG. 4 is a flowchart showing a portion of the operation shown in FIG. 3.

The raster image obtaining process for one line of the characters of the step S4 in FIG. 3 is performed by the program as shown in FIG. 4.

In FIG. 4, it is judged whether the next character exists or not at the step S10. If it is judged that it exists (YES), the flow branches to the step S11. In the step S11, the raster image for one character is obtained as described in detail later, and then returned to the step S10. Thus, until it is judged that it does not exist (NO) in the step S10, this operation is repeated while obtaining the raster image for each character one by one until obtaining the end character of the line of the characters. Then, the raster image for one line of the characters can be finally obtained.

Figure 5:
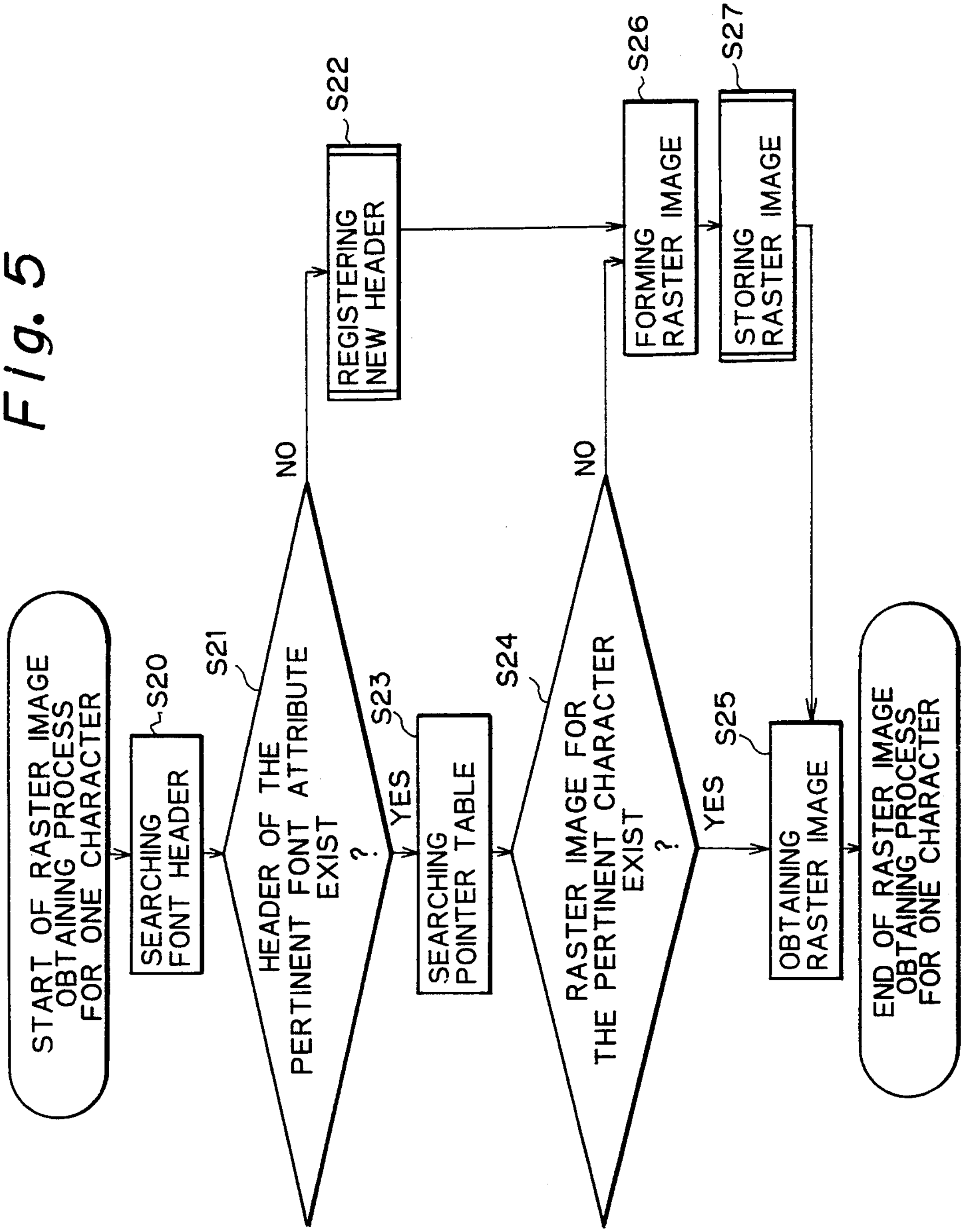
FIG. 5 is a flowchart showing a portion of the operation shown in FIG. 4.

The raster image obtaining process for one character of the step S11 in FIG. 4 is performed by the program as shown in FIG. 5.

When the font attribute and the code of the character to be displayed are given, the font headers $HD_0$ to $HD_{n-1}$ are searched in the step S20. Then, in the step S21, it is judged whether the font header of the pertinent font attribute exists or not. If such a font header does not exist (NO), the flow branches to the step S22, and a new font header is registered. This new header registering process will be explained later with reference to FIG. 6.

If it is judged that it exists (YES) in the step S21, the flow branches to the step S23. In the step S23, the pointer table corresponding to the font header is searched. Then, at the step S24, it is judged whether the raster image for the pertinent character exists or not. If it is judges that it exists (YES), the flow branches to the step S25. In the step S25, the raster image for the pertinent character is obtained.

If it is judged that it does not exist (NO) in the step S24, the flow branches to the step S26. In case that no data is registered in the pointer table right after forming the new header in the step S22, the flow also proceeds to the step S26.

In the step S26, the raster image is formed, and then the formed raster image is stored in the step S27. This raster image storing process of the step S27 will be described later with reference to FIG. 7. Then, in the step 25, the raster image is obtained.

The new header registering process of the step 22 in FIG. 5 will be explained hereinbelow with reference to FIG. 6.

Figure 6:
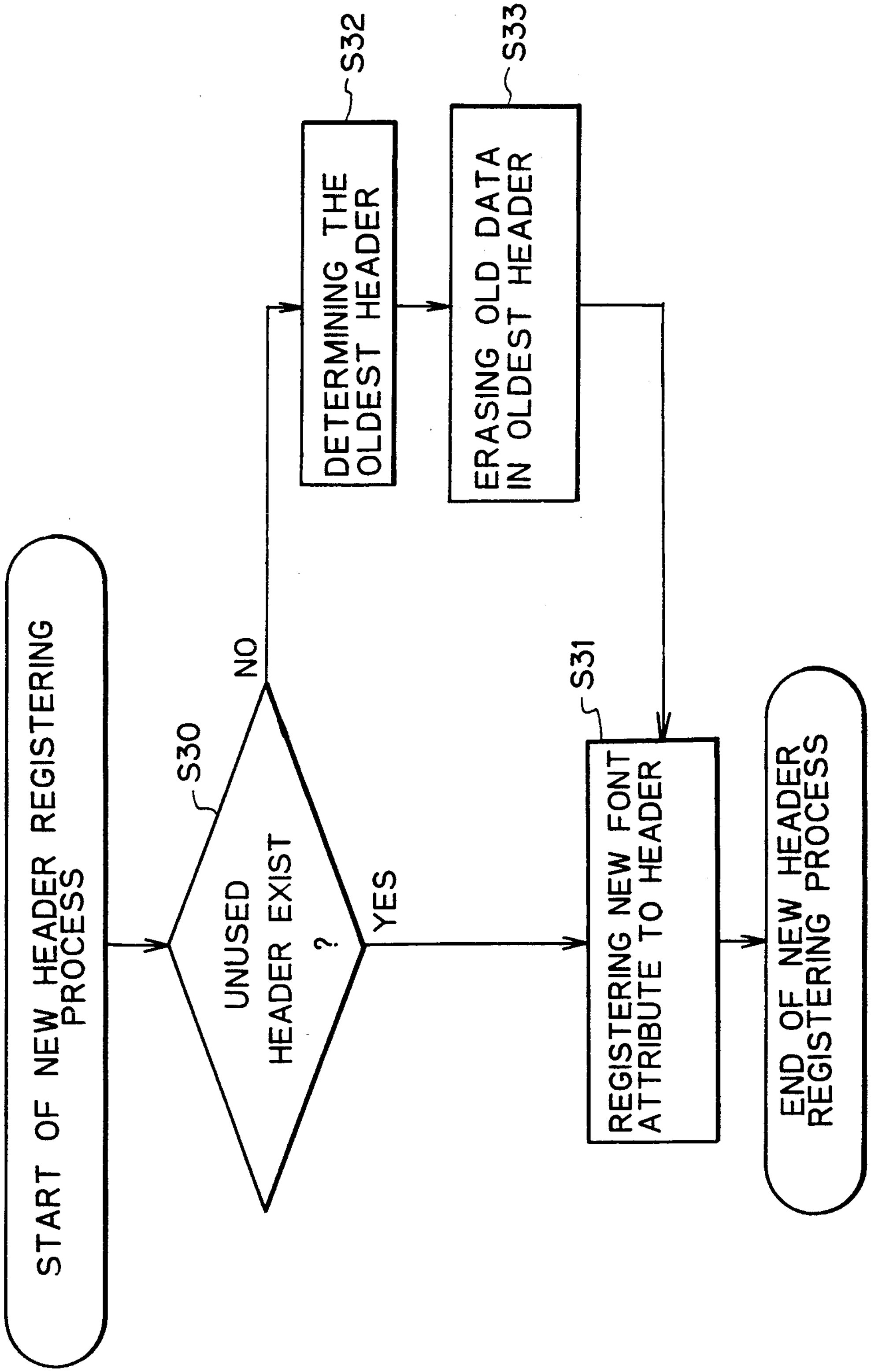
FIG. 6 is a flowchart showing a portion of the operation shown in FIG. 5.

In FIG. 6, it is judged whether an unused block in the n font headers $HD_0$ to $HD_{n-1}$, exists or not, in the step S30. If it is judged that it exists (YES), the flow branches to the step S31. In the step S31, the new font attribute is registered into this font header of the unused block.

If it is judged that it does not exist (NO) in the step S30, the flow branches to the step S32. In the step S32, the oldest header, i.e. the least recently used header, is determined by referring to the time of the most recent usage of the font header $HD_0$ to $HD_{n-1}$. Then, at the step S33, the old data content in this determined oldest header is erased, and at the step S31, the new font attribute is registered into this erased header. In this case, the memory block of the font buffer which has been accompanied by the old header is also released.

The raster image storing process of the step S27 in FIG. 5 will be explained hereinbelow with reference to FIG. 7.

Figure 7:
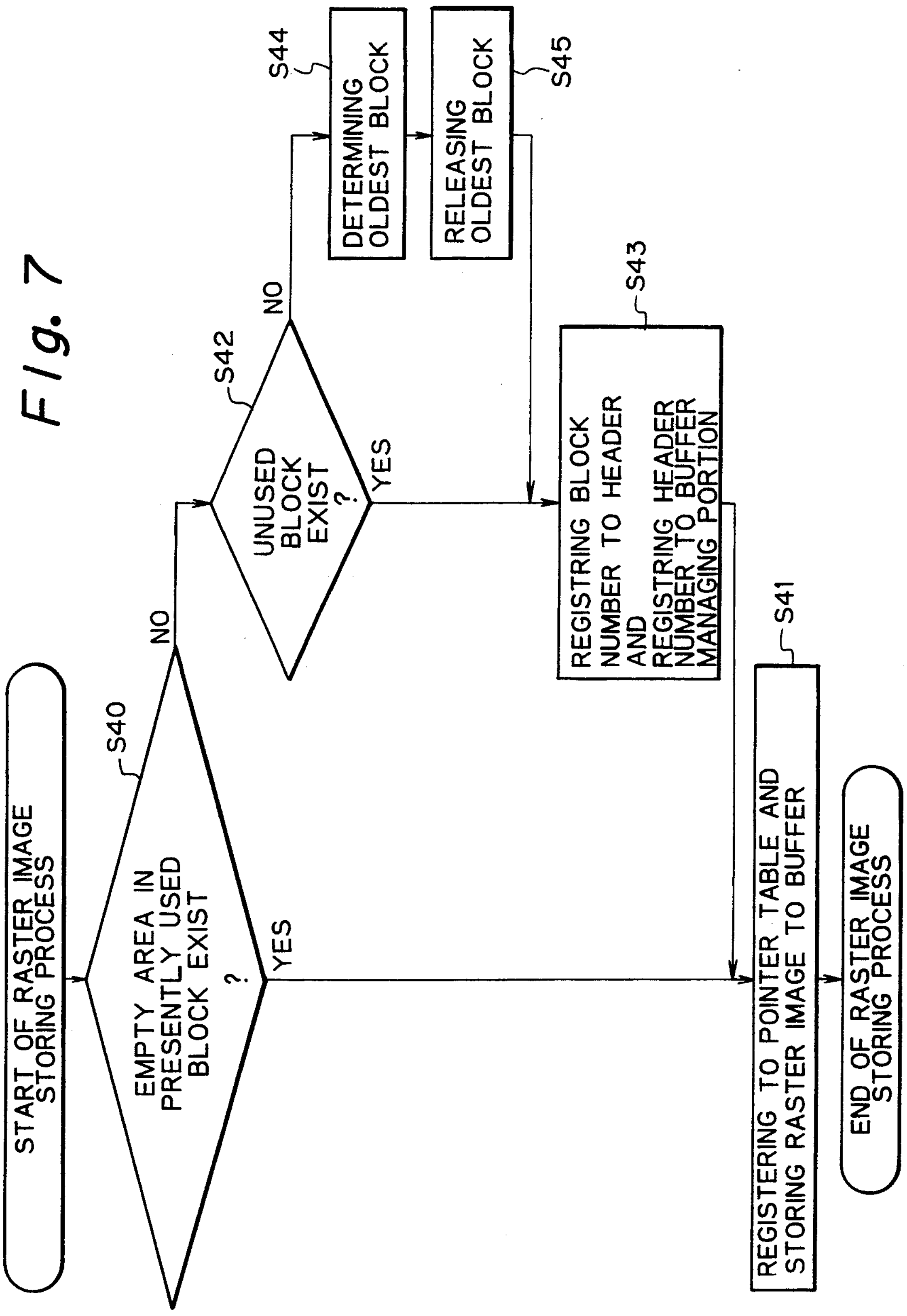
FIG. 7 is a flowchart showing another portion of the operation shown in FIG. 5.

In FIG. 7, it is judged whether an empty area exists or not in the font buffer block which is presently used by the font header, in the step S40. This judgment is performed by referring to the number of the registered characters stored in the font header. If it is judged that it exists (YES), the flow branches to the step S41. In the step S41, the raster image is stored into this font buffer block having the empty area, and the storage position of this raster image is registered into the corresponding pointer table.

If it is judged that it does not exist (NO) in the step S40, the flow branches to the step S42. In the step S42, it is judged whether an unused block exists or not, in the m font buffers $BF_0$ to $BF_{m-1}$. If it is judged that it exists (YES), the flow branches to the step S43. In the step S43, the block number is registered into the corresponding font header, and the header number is registered into the corresponding buffer managing portion. Then, in the step S41, the raster image is stored into this unused block, and the storage position of the raster image is registered into the corresponding pointer table.

If it is judged that it does not exist (NO) in the step S42, the flow branches to the step S44. In the step S44, the oldest block i.e. the least recently used block, is determined by referring to the time of the most recent usage of each buffer $BF_0$ to $BF_{m-1}$, which is stored in each buffer managing portion $BFC_0$ to $BFC_{m-1}$ accompanying the corresponding font buffer.

Then, in the step S45, the font header which corresponds to this oldest block, is found out by use of the buffer managing portion accompanying this oldest block, and then, the storage position data of the character in the oldest block is erased i.e. released from the pointer table accompanying this font header. Then, the flow proceeds to the step S43, the block number of the released font buffer is newly registered into the font header, and the header number is registered into the corresponding buffer managing portion. In the following step S41, the same process as aforementioned, is performed. In this manner, the raster image storing process is completed.

According to the present embodiment, the above described operations are repeatedly performed each time the font attribute and the code of the character to be displayed is given to the character display apparatus, so that the characters which have been used relatively recently and thus have high possibilities to be used in the near future, are stored in the font buffers $BF_0$ to $BF_{m-1}$. Thus, in many cases, there is no need to form a new raster image, instead the raster image can be quickly obtained from the font buffers $BF_0$ to $BF_{m-1}$. And that, the unuseful raster images of the characters which are not recently used, are sequentially erased in the order of the least recent usage, as the number of the usage of the character display apparatus is increased. Consequently, according to the present embodiment, the displaying speed in case of displaying multi-font characters can be increased to a great extent.

Many widely different embodiments of the present invention may be constricted without departing from the spirit and scope of the present invention. It should be understood that the present invention is not limited to the specific embodiments described in this specification, except as defined in the appended claims.

What is claimed is:

1. A character display apparatus, comprising:

an attribute management means for storing an attribute of each of a plurality of used fonts, including a respective plurality of font headers, each storing said attribute of each respective used font;

a raster image storage means for storing a raster image of said each used font;

an image position management means for storing a storage position of each raster image in said raster image storage means in correspondence with each attribute stored in said attribute management means, including a corresponding plurality of pointer tables each connected to a corresponding one of said font headers, a portion of each of said pointer tables being assigned to store said storage positions of raster images of predetermined characters for high frequency usage, while another portion is assigned to store said storage positions of raster images of characters for low frequency usage so that said storage positions of raster images of characters for high frequency usage may be accessed first;

a judgment means for judging whether a raster image of a character to be displayed is stored in said raster image storage means or not, by referring to said attribute management means and said image position management means;

a supplying means for supplying said raster image storage means with a raster image of a character to be displayed in case of said image of said character is not stored in said raster image storage means; and a display means for displaying an image of said character according to said raster image stored in said raster image storage means, in case that said raster image is stored therein.

2. A character display apparatus according to claim 1, wherein each of said font headers further stores a time of a most recent usage thereof, and said attribute management means includes means for erasing an old data content of a least recently used font header of said font headers by referring to the time of the most recent usage of each font header when a new font attribute is to be added.

3. A character display apparatus according to claim 1, wherein said raster image storage means comprises a font buffer.

4. A character display apparatus according to claim 1, further comprising a raster image formation means connected to said judging means and said supplying means for newly forming a raster image corresponding to said character to be displayed, in case that said raster image of said character to be displayed is not stored in said raster image storage means.

5. A character display apparatus according to claim 4, wherein said formed raster image is stored into an empty area of said raster image storage means when there exists said empty area, while said formed raster image is stored into an area storing a raster image of a least recently used character of characters stored in said raster image storage means when there does not exist said empty area.

* * * * *